United States Patent
Chen et al.

(10) Patent No.: US 10,674,769 B2
(45) Date of Patent: *Jun. 9, 2020

(54) ELECTRONIC CIGARETTE

(71) Applicant: Microjet Technology Co., Ltd., Hsinchu (TW)

(72) Inventors: Shih-Chang Chen, Hsinchu (TW); Li-Pang Mo, Hsinchu (TW); Shou-Hung Chen, Hsinchu (TW); Mei-Yen Chen, Hsinchu (TW); Chi-Feng Huang, Hsinchu (TW); Yung-Lung Han, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 178 days.

This patent is subject to a terminal disclaimer.

(21) Appl. No.: 15/943,121

(22) Filed: Apr. 2, 2018

(65) Prior Publication Data

US 2018/0289064 A1 Oct. 11, 2018

(30) Foreign Application Priority Data

Apr. 11, 2017 (TW) .............................. 106112081 A

(51) Int. Cl.
*A24F 47/00* (2020.01)
*G05B 15/02* (2006.01)
(Continued)

(52) U.S. Cl.
CPC .............. *A24F 47/008* (2013.01); *A24F 7/04* (2013.01); *A24F 40/48* (2020.01); *F04B 43/046* (2013.01);
(Continued)

(58) Field of Classification Search
CPC .................................. A24F 47/008; A24F 7/04
(Continued)

(56) References Cited

U.S. PATENT DOCUMENTS 8,152,491 B2 * 4/2012 Wakabayashi ........ F04B 17/003
310/330
8,539,959 B1 * 9/2013 Scatterday ............ A61M 15/06
131/194
(Continued)

FOREIGN PATENT DOCUMENTS

CN 1467376 A 1/2004
CN 1575673 A 2/2005
(Continued)

OTHER PUBLICATIONS

Extended European Search Report for European Application No. 18165630.7, dated Aug. 22, 2018.

*Primary Examiner* — Eric Yaary
*Assistant Examiner* — Russell E Sparks
(74) *Attorney, Agent, or Firm* — Birch, Stewart, Kolasch & Birch, LLP

(57) ABSTRACT

An electronic cigarette includes a power supply device, a sensing unit, an atomizer, a liquid storage structure and a fluid transportation device. The atomizer includes an electric heater and a liquid conduit. The liquid conduit has an input port at one end and plural perforations at the other end, and the electric heater is disposed around the liquid conduit. The liquid storage structure includes a passageway and a liquid container. A cigarette liquid is stored in the liquid container. The fluid transportation device includes an input channel and an output channel. The input channel is in communication with the liquid container. The output channel is in communication with the liquid conduit of the atomizer. The cigarette liquid is transferred to the atomizer at a certain amount. Consequently, an atomized vapor is generated.

17 Claims, 16 Drawing Sheets

(51) Int. Cl.
*A24F 40/48* (2020.01)
*F04B 43/04* (2006.01)
*A24F 40/10* (2020.01)
*A24F 7/04* (2006.01)
*F16K 7/00* (2006.01)
*H05B 3/44* (2006.01)

(52) U.S. Cl.
CPC ............... *F16K 7/00* (2013.01); *G05B 15/02* (2013.01); *H05B 3/44* (2013.01); *A24F 40/10* (2020.01)

(58) Field of Classification Search
USPC .......................................................... 131/329
See application file for complete search history.

(56) References Cited

U.S. PATENT DOCUMENTS

| | | | | |
|---|---|---|---|---|
| 9,205,665 | B2* | 12/2015 | Kaneko | B41J 2/17596 |
| 2013/0213418 | A1* | 8/2013 | Tucker | A24F 47/008 |
| | | | | 131/328 |
| 2015/0272216 | A1 | 10/2015 | Dai et al. | |
| 2015/0282527 | A1 | 10/2015 | Henry, Jr. | |
| 2015/0351456 | A1* | 12/2015 | Johnson | A24F 47/008 |
| | | | | 131/329 |
| 2016/0213065 | A1 | 7/2016 | Wensley et al. | |
| 2017/0086504 | A1* | 3/2017 | Cameron | A24F 47/008 |
| 2017/0360099 | A1* | 12/2017 | Duc | A24F 47/008 |
| 2018/0220707 | A1* | 8/2018 | Biel | A61M 11/042 |
| 2019/0223507 | A1* | 7/2019 | Qiu | A24F 47/008 |

FOREIGN PATENT DOCUMENTS

| | | | | |
|---|---|---|---|---|
| CN | 201319860 | | 10/2009 | |
| CN | 201379072 | Y | 1/2010 | |
| CN | 104738816 | A | 7/2015 | |
| CN | 204907944 | U | 12/2015 | |
| TW | 201010795 | A | 3/2010 | |
| TW | M545463 | U | 7/2017 | |
| WO | WO-2018050072 | A1 * | 3/2018 | ........... A24F 47/008 |

* cited by examiner

ELECTRONIC CIGARETTE
>
> ## FIELD OF THE INVENTION
>
> The present invention relates to an electronic cigarette, and more particularly to an electronic cigarette with a fluid transportation device.
>
> ## BACKGROUND OF THE INVENTION
>
> Nowadays, electronic cigarettes are widely used to replace the conventional tobacco cigarettes. FIG. 1A is a schematic cross-sectional view illustrating a conventional electronic cigarette. FIG. 1B is a schematic cross-sectional view illustrating the structure of the atomizer of the conventional electronic cigarette. As shown in FIGS. 1A and 1B, the electronic cigarette comprises a first casing 1a, a second casing 1b, a power supply device 2, a sensing unit 3, an atomizer 4 and a liquid storage structure 5. The first casing 1a and the second casing 1b are thin-wall metal pipes, e.g., stainless steel pipes. The power supply device 2, the sensing unit 3, the atomizer 4 and the liquid storage structure 5 are disposed within the first casing 1a and the second casing 1b. After the first casing 1a and the second casing 1b are combined together, the electronic cigarette is assembled. The length and diameter of the electronic cigarette are similar to those of the conventional tobacco cigarette. The power supply device 2 and the sensing unit 3 are disposed within the first casing 1a. The first casing 1a comprises at least one inlet 1c, which is disposed near the sensing unit 3. The atomizer 4 and the liquid storage structure 5 are disposed within the second casing 1b. The atomizer 4 is fixed and supported on a bracket 7. The atomizer 4 comprises an electric heater 41, a liquid infiltration part 42 and a liquid transfer part 43. The liquid infiltration part 42 is disposed around the electric heater 41. The liquid transfer part 43 tightly holds the liquid infiltration part 42. The electric heater 41 has a hollow structure. The liquid storage structure 5 is disposed within the second casing 1b. The liquid storage structure 5 comprises a passageway 51 and a liquid container 52. The passageway 51 is formed within the liquid storage structure 5 for allowing the gas to pass through. The liquid container 52 is disposed around the passageway 51. A communication part 431 of the liquid transfer part 43 of the atomizer 4 is contacted with the liquid container 52. Consequently, the cigarette liquid in the liquid container 52 can be absorbed by the liquid infiltration part 42 through the communication part 431 of the liquid transfer part 43. Moreover, an intake-and-electric-connection element 10 is disposed between the atomizer 4 and the sensing unit 3. An airflow path is defined by the intake-and-electric-connection element 10. Moreover, the intake-and-electric-connection element 10 is in communication with the passageway 51 of the liquid storage structure 5. After the ambient airflow is fed into the at least one inlet 1c, the airflow is transferred to the passageway 51 of the liquid storage structure 5 through the sensing unit 3 and the electric heater 41. The electronic cigarette further comprises an electrode ring 8. The electrode ring 8 is electrically connected with two pins of the electric heater 41. Moreover, the electrode ring 8 is electrically connected with the power supply device 2 through the electric connection between the intake-and-electric-connection element 10 and the sensing unit 3. The electric circuit of the electronic cigarette is selectively enabled or disabled according to the result of sensing the airflow by the sensing unit 3. In one embodiment, the sensing unit 3 can switch on or off the electric circuit of the power supply device 2 according to the airflow detected by the sensing unit 3. Moreover, a mouthpiece 9 is disposed on an end of the second casing 1b and in communication with the passageway 51 of the liquid storage structure 5.
>
> The operations of the electronic cigarette will be described as follows. As mentioned above, the cigarette liquid in the liquid container 52 can be absorbed by the liquid infiltration part 42 through the communication part 431 of the liquid transfer part 43. When the user smokes and inhales the air through the mouthpiece 9, the airflow flows through the electronic cigarette. According to the sensing result of the sensing unit 3, the electric circuit of the electronic cigarette is enabled. After the electric circuit of the electronic cigarette is enabled, the power supply device 2 provides electric power to the electrode ring 8. Consequently, the electric heater 41 is enabled to heat the cigarette liquid. Meanwhile, the cigarette liquid in the liquid infiltration part 42 is heated and atomized by the electric heater 41. Consequently, the user inhales the atomized vapor from the passageway 51 of the liquid storage structure 5 through the mouthpiece 9. When the user stops smoking, the airflow does not flow through the electronic cigarette. According to the sensing result of the sensing unit 3, the electric circuit of the electronic cigarette is disabled. Meanwhile, the electric heater 41 stops heating the cigarette liquid.
>
> As mentioned above, the cigarette liquid is transferred to the liquid infiltration part 42 through the communication part 431 of the liquid transfer part 43. However, this design has some drawbacks.
>
> Firstly, it is difficult to precisely control the amount of the cigarette liquid to be transferred to the liquid infiltration part 42 through the communication part 431 of the liquid transfer part 43. Consequently, the cigarette liquid is not uniformly absorbed by the liquid infiltration part 42. In case that a site of the liquid infiltration part 42 absorbs a small amount of the cigarette liquid, the liquid drop is not uniformly generated. After the liquid drop of the cigarette liquid is heated by the electric heater 41, the atomized vapor has a burning taste that is unpleasing to the user.
>
> Secondly, since the amount of the cigarette liquid to be transferred to the liquid infiltration part 42 cannot be precisely controlled, another problem occurs. Especially when the mouthpiece 9 faces up, the force of gravity continuously transfers the cigarette liquid from the liquid container 52 to the liquid infiltration part 42. Once the cigarette liquid absorbed by the liquid infiltration part 42 reaches a saturation state, the cigarette liquid drops down to the bracket 7 and the intake-and-electric-connection element 10. Then, the cigarette liquid drops down through the sensing unit 3 and leaks out from the at least one inlet 1c. Meanwhile, a liquid leakage problem occurs.
>
> Moreover, there are some differences between the electronic cigarettes and the real cigarettes. For example, when people smoke the real cigarettes, they are accustomed to smoking quickly, shortly and laboriously. Whereas, people smoke the electronic cigarettes lengthily and gently. While the user smokes the real cigarette and inhales a great amount of oxygen gas, the user can quickly get the wanted amount of smoke because the tobacco is burnt and atomized faster. However, while the user smokes the conventional electronic cigarette, the electric power to be transmitted to the electric heater and the heating speed cannot be adjusted. If the heating speed is too fast, the cigarette liquid is atomized by the atomizer very quickly. Since the cigarette liquid of the conventional electronic cigarette is provided according to a siphon effect, the speed of providing the cigarette liquid is too slow. Under this circumstance, the amount of the atomized vapor is insufficient or the atomized is burnt out. Since the electric power transmitted to the atomizer of the conventional electronic cigarette is fixed, the user has to smoke the electronic cigarette lengthily and gently to provide a sufficient heating time to the atomizer. That is, the conventional method of atomizing the cigarette liquid of the electronic cigarette still has some drawbacks. The above problems lead to significant differences between the real cigarette and the electronic cigarette. Because of these drawbacks, the user does not prefer to choose the electronic cigarette in replace of the real cigarette.

For solving the drawbacks of the conventional technologies, the present invention provides an improved electronic cigarette.

SUMMARY OF THE INVENTION

An object of the present invention provides an electronic cigarette. The cooperation of a fluid transportation device and a liquid conduit of an atomizer forms a controllable switch element. The amount of the cigarette liquid to be transferred to the atomizer is precisely controlled by the controllable switch element. Consequently, the taste of the atomized vapor is enhanced, and the liquid leakage problem is solved.

Another object of the present invention provides an electronic cigarette for allowing the user to inhale a great amount of atomized vapor quickly. The electronic cigarette includes an airflow sensor and an air pressure sensor. The air pressure sensor issues a detection signal to the control module according to the result of detecting the pressure of the airflow. According to the detection signal, a control module adjusts the speed of atomizing the cigarette liquid and the speed of providing the cigarette liquid. That is, the control signal from the control module is adjusted according to the detection signal. Since the driving frequency of the fluid transportation device and the driving power of the heater module are correspondingly changed according to the control signal, the speed of atomizing the cigarette liquid and the speed of providing the cigarette liquid are adjusted. Consequently, the user can inhale a great amount of atomized vapor quickly, or the user can inhale the same amount of atomized vapor.

In accordance with an aspect of the present invention, there is provided an electronic cigarette. The electronic cigarette includes a power supply device, a sensing unit, an atomizer, a liquid storage structure, a fluid transportation device, a casing and a mouthpiece. The power supply device provides a driving power and a control signal. An electric circuit of the power supply device is selectively enabled or disabled according to a result of detecting an airflow by the sensing unit. The atomizer includes an electric heater and a liquid conduit. The liquid conduit has an input port at one end and plural perforations at the other end, and the electric heater is disposed around the liquid conduit. The liquid storage structure includes a passageway and a liquid container. The airflow is allowed to pass through the passageway. A cigarette liquid is stored in the liquid container. The fluid transportation device includes an input channel and an output channel. The input channel is in communication with the liquid container. The output channel is in communication with the input port of the liquid conduit of the atomizer. The cigarette liquid is transferred from the liquid container to the liquid conduit through the fluid transportation device and transferred to the outside of the liquid conduit through the plural perforations. Consequently, the cigarette liquid is transferred to the electric heater of the atomizer at a certain amount. After the cigarette liquid is heated by the electric heater, an atomized vapor is generated. The power supply device, the sensing unit, the fluid transportation device, the atomizer, the liquid storage structure and an intake-and-electric-connection element are disposed within the casing. The casing has an inlet for the airflow to pass through. After the airflow is fed into the inlet, the airflow passes through the sensing unit and the passageway of the liquid storage structure along an airflow path. The fluid transportation device and the electric heater of the atomizer are electrically connected with the power supply device and the sensing unit through the intake-and-electric-connection element. The mouthpiece is located at an end of the casing and in communication with the passageway of the liquid storage structure. The mouthpiece has a mouth. The atomized vapor is transferred through the passageway of the liquid storage structure and the mouth.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
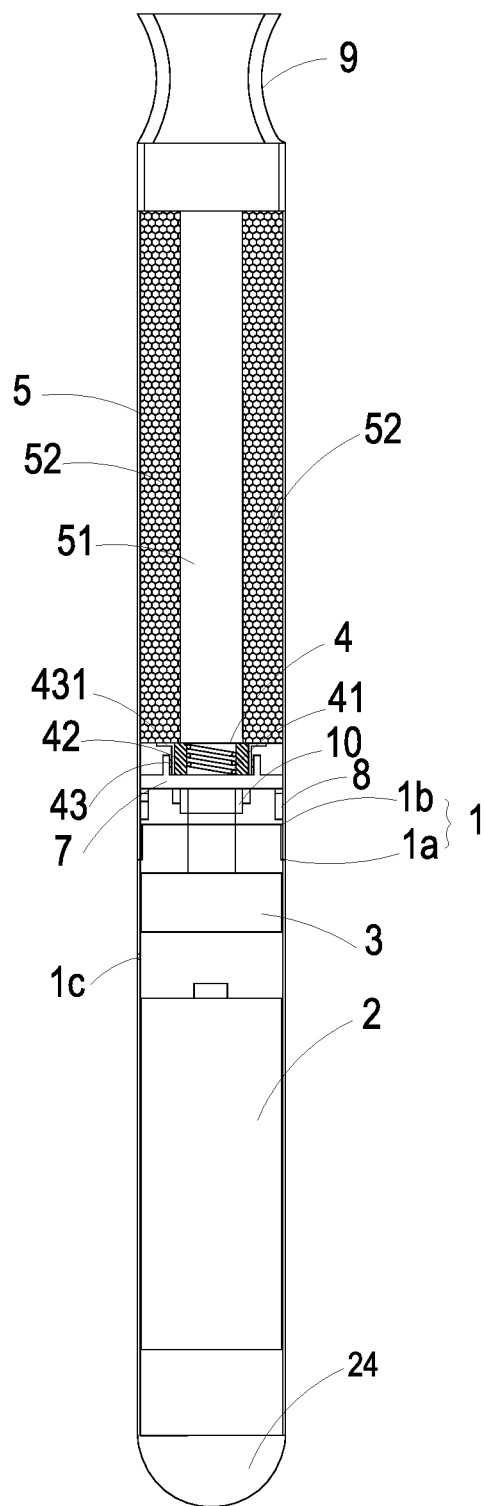
FIG. 1A is a schematic cross-sectional view illustrating a conventional electronic cigarette.
Figure 1B:
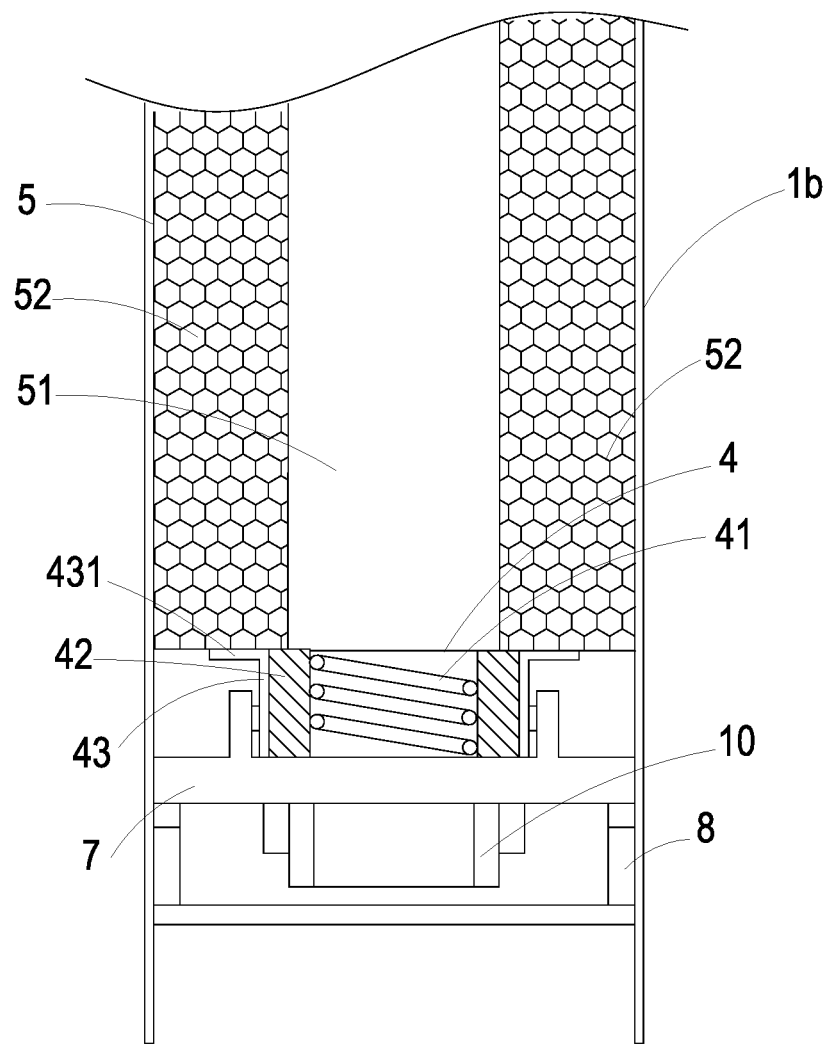
FIG. 1B is a schematic cross-sectional view illustrating the structure of the atomizer of the conventional electronic cigarette.
Figure 2A:
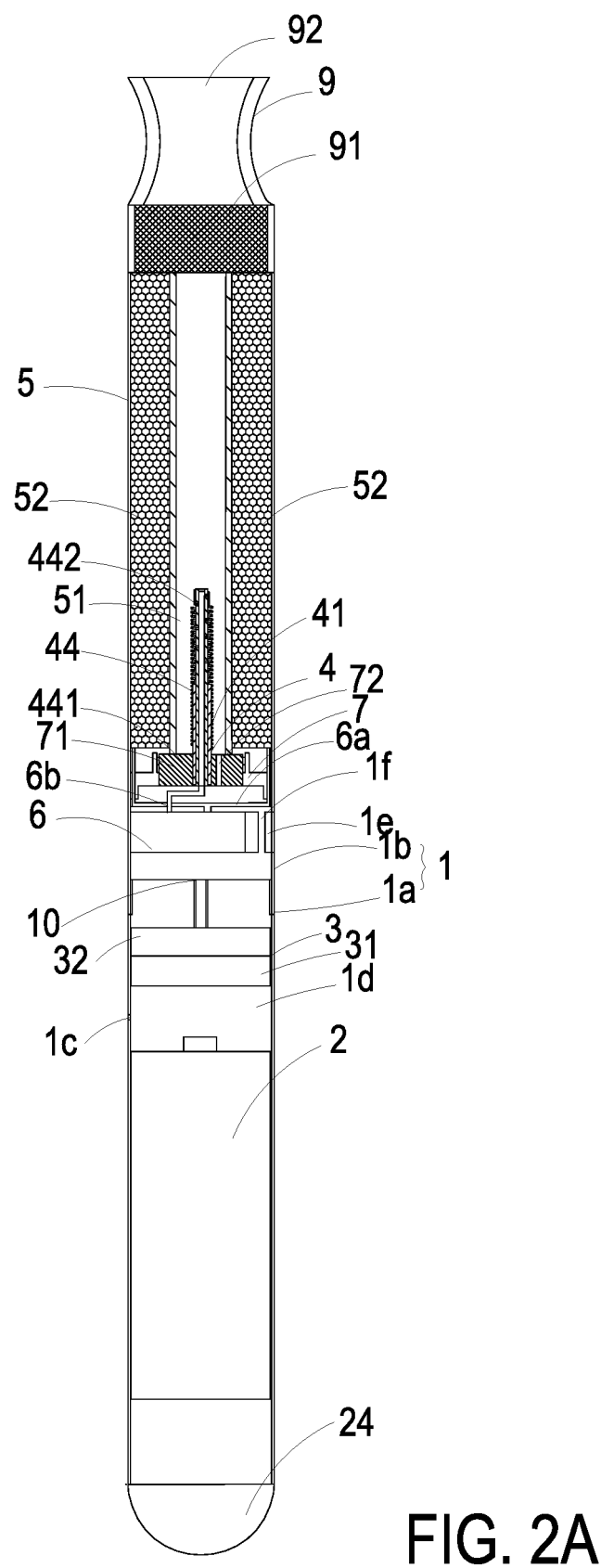
FIG. 2A is a schematic cross-sectional view illustrating an electronic cigarette according to an embodiment of the present invention.
Figure 2B:
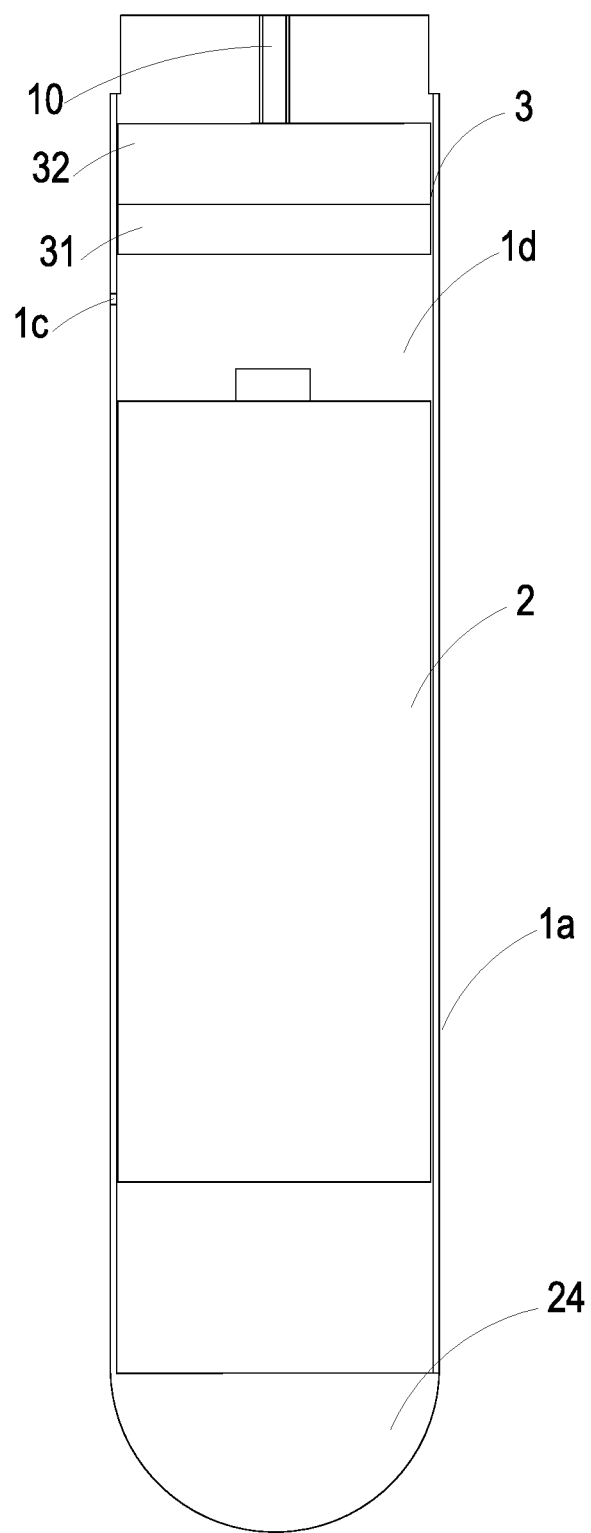
FIG. 2B is a schematic cross-sectional view illustrating some components near the power supply device of the electronic cigarette according to the embodiment of the present invention.
Figure 2C:
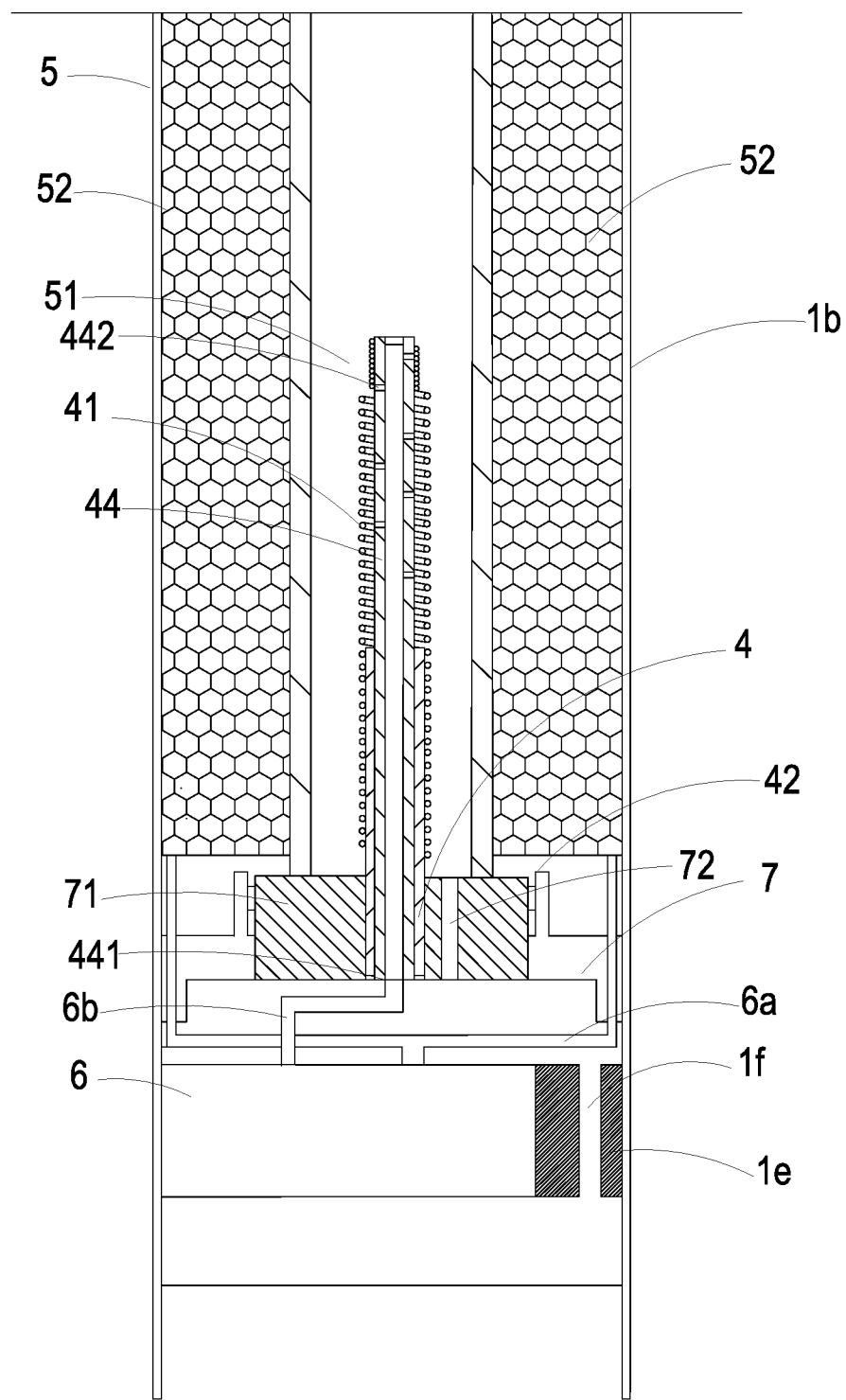
FIG. 2C is a schematic cross-sectional view illustrating some components near the atomizer of the electronic cigarette according to the embodiment of the present invention.

FIG. 2A is a schematic cross-sectional view illustrating an electronic cigarette according to an embodiment of the present invention. FIG. 2B is a schematic cross-sectional view illustrating some components near the power supply device of the electronic cigarette according to the embodiment of the present invention. FIG. 2C is a schematic cross-sectional view illustrating some components near the atomizer of the electronic cigarette according to the embodiment of the present invention. As shown in FIGS. 2A, 2B and 2C, the electronic cigarette of the present invention comprises a casing 1, a power supply device 2, a sensing unit 3, an atomizer 4, a liquid storage structure 5, a fluid transportation device 6 and a mouthpiece 9. The casing 1 is a combination of a first casing 1a and a second casing 1b. The second casing 1b is replaceable. The first casing 1a and the second casing 1b are thin-wall metal pipes, e.g., stainless steel pipes. After the first casing 1a and the second casing 1b are combined together, the electronic cigarette is assembled. The length and diameter of the electronic cigarette are similar to those of the conventional tobacco cigarette. The power supply device 2 and the sensing unit 3 are disposed within the first casing 1a. The first casing 1a comprises at least one inlet 1c, which is disposed near the sensing unit 3.

Figure 3:
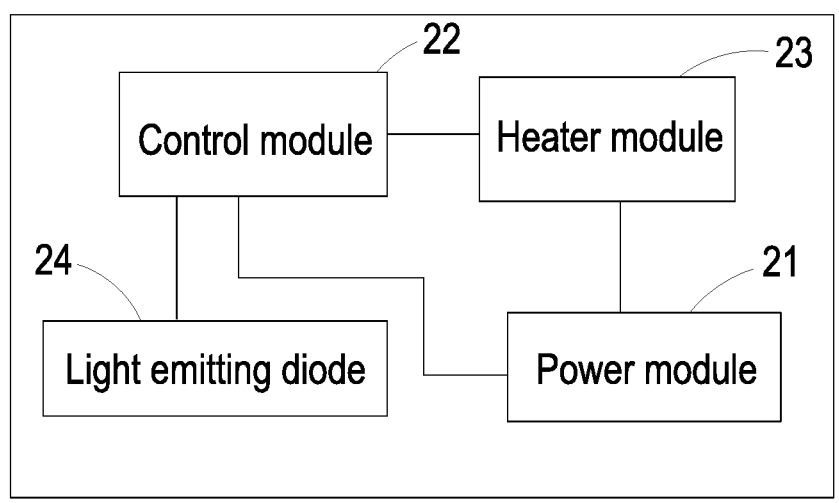
FIG. 3 is a schematic functional block diagram illustrating the power supply device of the electronic cigarette according to the embodiment of the present invention.

FIG. 3 is a schematic functional block diagram illustrating the power supply device of the electronic cigarette according to the embodiment of the present invention. As shown in FIG. 3, the power supply device 2 comprises a power module 21, a control module 22, a heater module 23 and a light emitting diode 24. The power module 21 is a rechargeable battery or a disposable battery for providing a driving power to the control module 22, the heater module 23 and the sensing unit 3. The control module 22 provides a first control signal to the heater module 23 and provides a second control signal to the fluid transportation device 6. The heater module 23 provides electric energy to the atomizer 4. The light emitting diode 24 is located at a front end of the first casing 1a. Under control of the control module 22, the light emitting diode 24 is turned on or turned off to provide or not provide a prompt signal so as to indicate the operating condition of the electronic cigarette or provides a prompt signal with varied intensity so as to indicate the intensity of the atomized vapor.

Please refer to FIGS. 2A, 2B and 2C again. The sensing unit 3 is disposed within the first casing 1a. There is an airflow chamber 1d between the sensing unit 3 and the power supply device 2. After the ambient airflow is introduced into the airflow chamber 1d through the at least one inlet 1c, the airflow passes through the sensing unit 3 along an airflow path. In an embodiment, the sensing unit 3 includes an airflow sensor 31 and an air pressure sensor 32. The airflow sensor 31 issues a detection signal to the control module 22 according to the result of detecting the airflow. Consequently, the electric connection of the power supply device 2 is selectively established or interrupted. That is, the control module 22 of the power supply device 2 is selectively enabled or disabled to provide the control signal and the heater module 23 is selectively provide the electric energy to the atomizer 4. The air pressure sensor 32 issues a detection signal to the control module 22 according to the result of detecting the pressure of the airflow. According to the detection signal, the control module 22 adjusts the speed of atomizing the cigarette liquid and the speed of providing the cigarette liquid. That is, the control signal from the control module 22 is adjusted according to the detection signal. Since the driving frequency of the fluid transportation device 6 and the driving power of the heater module 23 are correspondingly changed according to the control signal, the speed of atomizing the cigarette liquid and the speed of providing the cigarette liquid are adjusted. Moreover, an intake-and-electric-connection element 10 is disposed between the atomizer 4 and the sensing unit 3. The power supply device 2 is electrically connected with the atomizer 4 and the fluid transportation device 6 through the intake-and-electric-connection element 10. The airflow channel corresponding to the sensing unit 3 is in communication with the second casing 1b through the intake-and-electric-connection element 10.

Figure 2D:
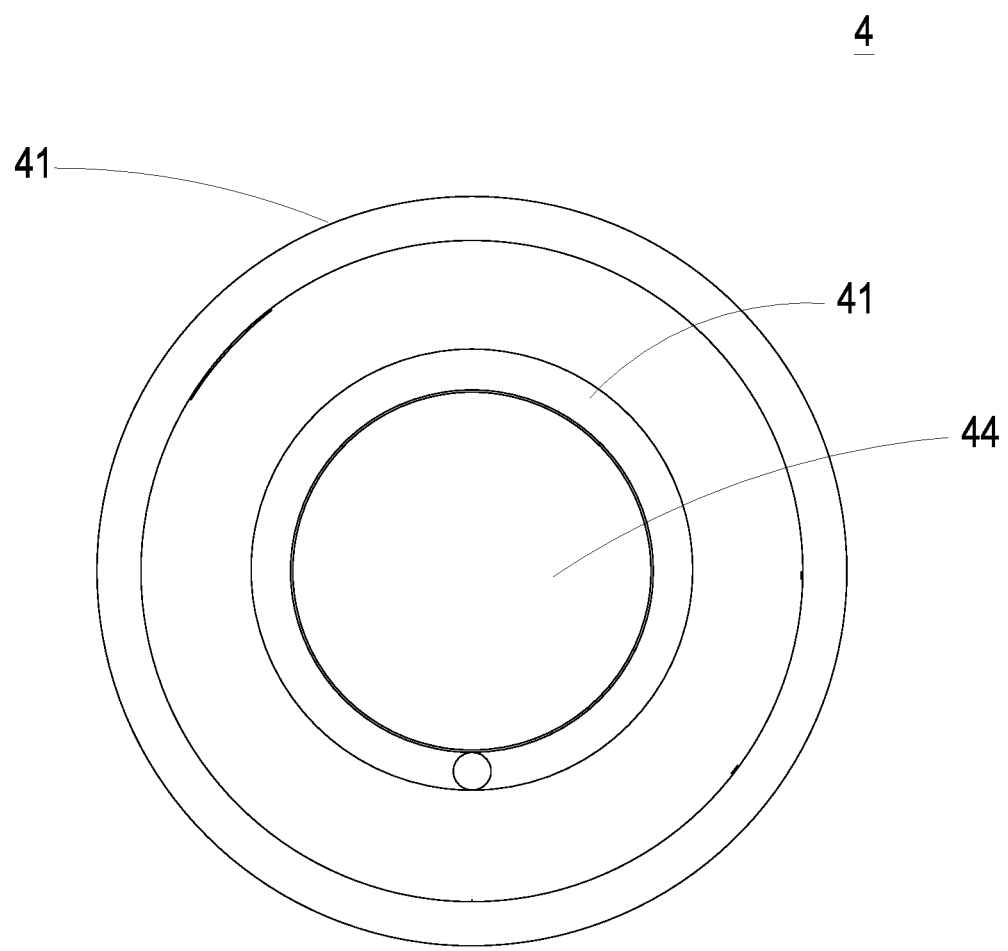
FIG. 2D is a schematic top view illustrating the structure of the atomizer of the electronic cigarette according to the embodiment of the present invention.

FIG. 2D is a schematic top view illustrating the structure of the atomizer of the electronic cigarette according to the embodiment of the present invention. Please refer to FIGS. 2A, 2C and 2D. The atomizer 4 is disposed within the second casing 1b. The atomizer 4 is fixed and supported on a fixing seat 71 of a bracket 7. The atomizer 4 comprises an electric heater 41 and a liquid conduit 44. In one embodiment, the electric heater 41 is disposed on a first end of the passageway 51. The electric heater 41 has a hollow structure. The two pins (not shown) of the electric heater 41 are electrically connected with the power supply device 2 and the sensing unit 3 through the intake-and-electric-connection element 10. According to the flowing condition of the airflow detected by the sensing unit 3, the electric heater 41 is controlled to selectively heat or stop heating. The liquid conduit 44 is a tube for transferring liquid. Preferably but not exclusively, the liquid conduit 44 is a stainless steel tube. The liquid conduit 44 is disposed on the fixing seat 71 and has an input port 441 at one end and plural perforations 442 at the other end. The electric heater 41 is disposed on the fixing seat 71 and disposed around the liquid conduit 44. The fixing seat 71 has a channel 72.

Please refer to FIGS. 2A and 2C. The liquid storage structure 5 is disposed within the second casing 1b. The liquid storage structure 5 comprises a passageway 51 and a liquid container 52. The passageway 51 is formed within the liquid storage structure 5 for allowing the gas to pass through. The cigarette liquid is stored in the liquid container 52. Moreover, the liquid container 52 is in communication with an input channel 6a of the fluid transportation device 6. In accordance with a feature of the present invention, the fluid transportation device 6 is used as a switch element for selectively allowing the cigarette liquid from the liquid container 52 to pass through. The fluid transportation device 6 is supported and positioned in the second casing 1b through a supporting seat 1e. The supporting seat 1e has a gas channel 1f. An output channel 6b of the fluid transportation device 6 is in communication with the input port 441 of the liquid conduit 44 of the atomizer 4. When the fluid transportation device 6 is enabled, the cigarette liquid is transferred from the liquid container 52 to the liquid conduit 44 through the fluid transportation device 6 and then transferred to the outside of the liquid conduit 44 through the perforations 442. Meanwhile, the cigarette liquid is heated and atomized by the electric heater 41. Moreover, the passageway 51 of the liquid storage structure 5 is in communication with the intake-and-electric-connection element 10 through the gas channel 72 of the fixing seat 71 and the gas channel 1f of the supporting seat 1e. After the ambient airflow is fed into the at least one inlet 1c, the airflow is transferred to the passageway 51 of the liquid storage structure 5 through the sensing unit 3 and the electric heater 41 of the atomizer 4.

Figure 4:
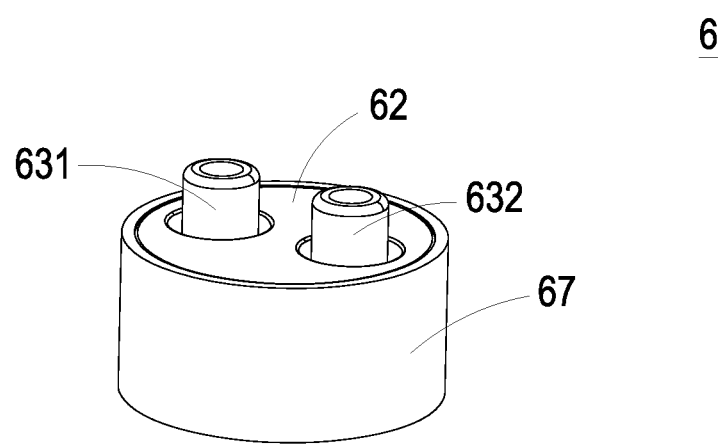
FIG. 4 is a schematic perspective view illustrating the fluid transportation device of the electronic cigarette according to the embodiment of the present invention.
Figure 5A:
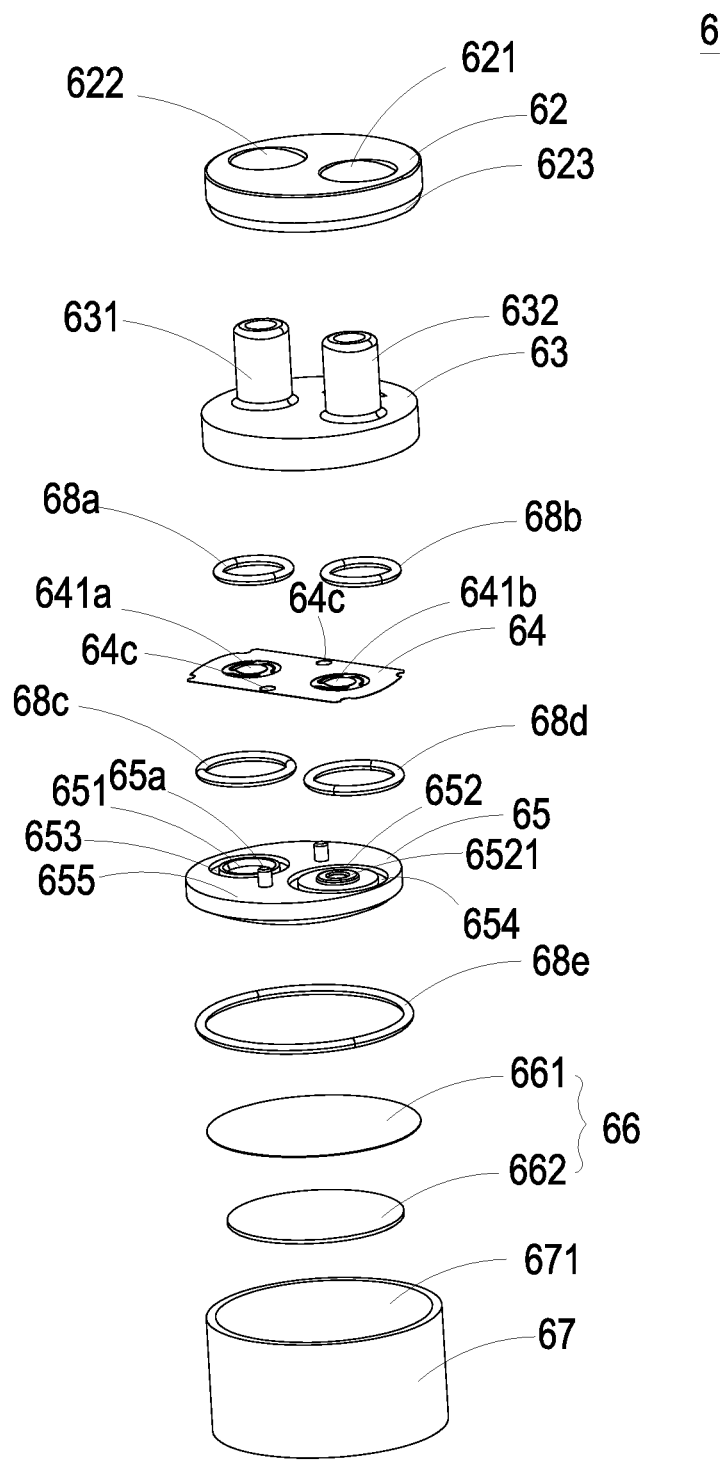
FIG. 5A is a schematic exploded view illustrating the fluid transportation device of FIG. 4 and taken along a front side.
Figure 5B:
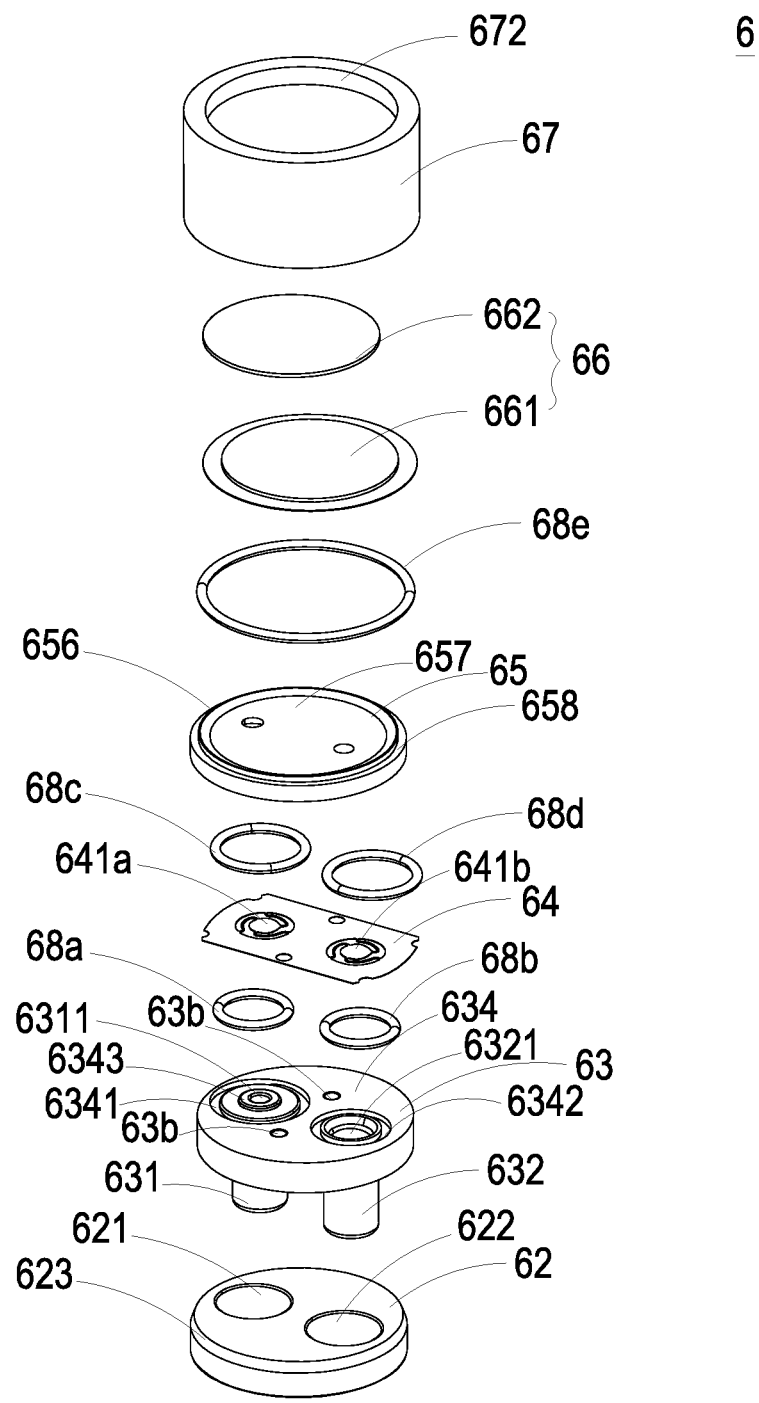
FIG. 5B is a schematic exploded view illustrating the fluid transportation device of FIG. 4 and taken along a rear side.
Figure 6A:
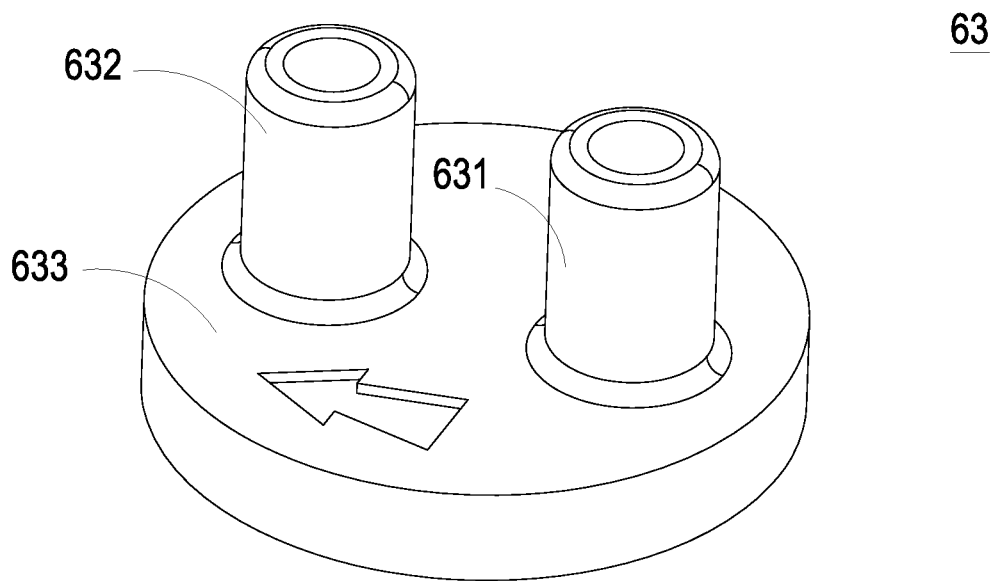
FIG. 6A is a schematic perspective view illustrating the valve body of the fluid transportation device of FIG. 4 and taken along the front side.
Figure 6B:
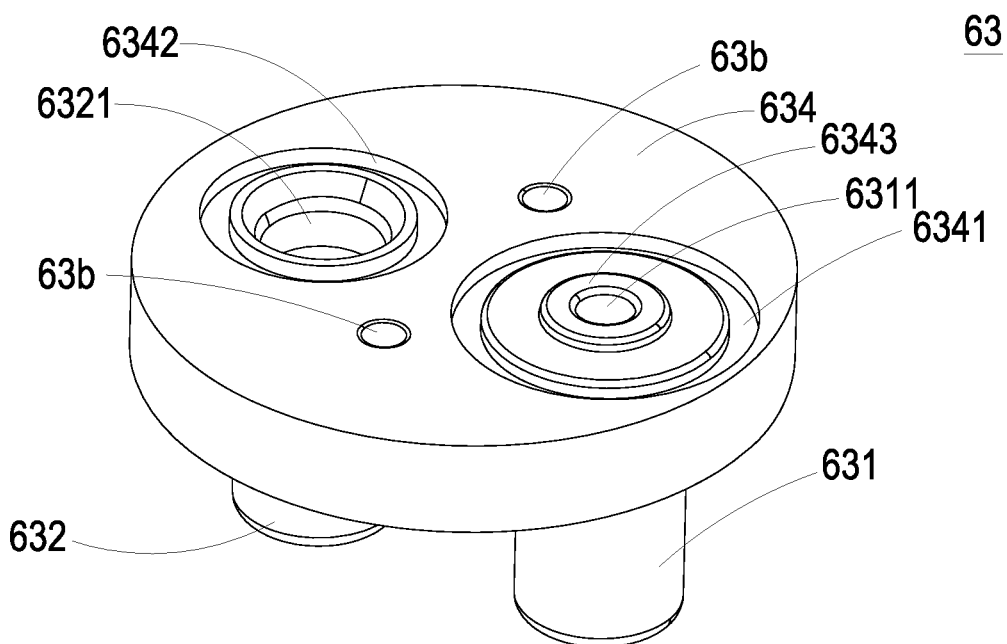
FIG. 6B is a schematic perspective view illustrating the valve body of the fluid transportation device of FIG. 4 and taken along the rear side.
Figure 7A:
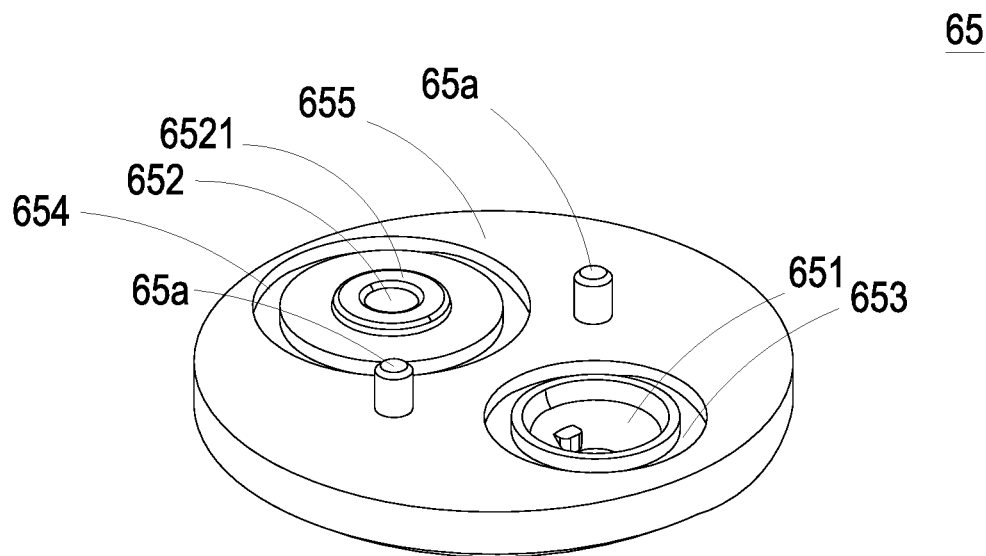
FIG. 7A is a schematic perspective view illustrating the valve chamber seat of the fluid transportation device of FIG. 4 and taken along the front side.
Figure 7B:
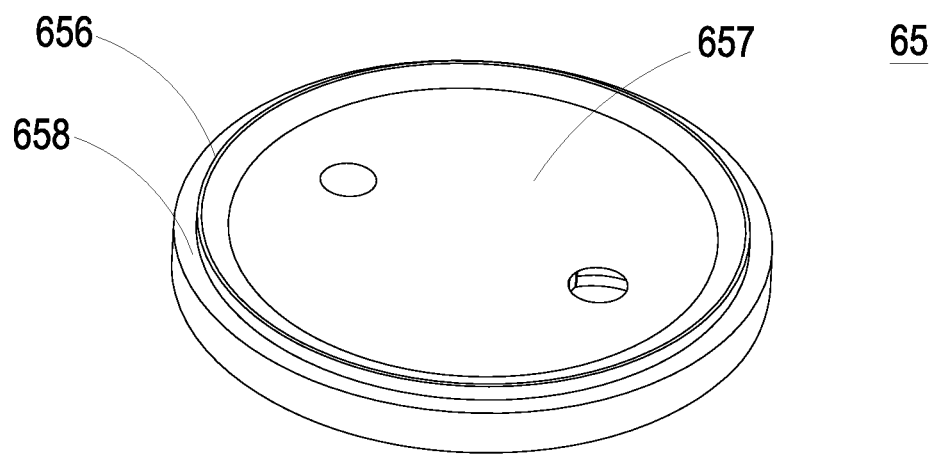
FIG. 7B is a schematic perspective view illustrating the valve chamber seat of the fluid transportation device of FIG. 4 and taken along the rear side.

FIG. 4 is a schematic perspective view illustrating the fluid transportation device of the electronic cigarette according to the embodiment of the present invention. FIG. 5A is a schematic exploded view illustrating the fluid transportation device of FIG. 4 and taken along a front side. FIG. 5B is a schematic exploded view illustrating the fluid transportation device of FIG. 4 and taken along a rear side. FIG. 6A is a schematic perspective view illustrating the valve body of the fluid transportation device of FIG. 4 and taken along the front side. FIG. 6B is a schematic perspective view illustrating the valve body of the fluid transportation device of FIG. 4 and taken along the rear side. FIG. 7A is a schematic perspective view illustrating the valve chamber seat of the fluid transportation device of FIG. 4 and taken along the front side. FIG. 7B is a schematic perspective view illustrating the valve chamber seat of the fluid transportation device of FIG. 4 and taken along the rear side.

Please refer to FIGS. 4, 5A, 5B, 6A, 6B, 7A and 7B. The fluid transportation device 6 comprises a valve body 63, a valve membrane 64, a valve chamber seat 65, an actuator 66 and an outer sleeve 67. After the valve body 63, the valve membrane 64, the valve chamber seat 65 and the actuator 66 are sequentially stacked on each other, the combination of the valve body 63, the valve membrane 64, the valve chamber seat 65 and the actuator 66 is accommodated within the outer sleeve 67 and assembled with the outer sleeve 67.

The valve body 63 and the valve chamber seat 65 are the main components for guiding the fluid to be inputted into or outputted from of the fluid transportation device 6. The valve body 63 comprises an inlet passage 631 and an outlet passage 632. The inlet passage 631 and the outlet passage 632 penetrate a first surface 633 and a second surface 634 of the valve body 63. An inlet via 6311 is formed in the second surface 634 and in communication with the inlet passage 631. Moreover, a groove 6341 is formed in the second surface 634 and disposed around the inlet via 6311. A protrusion block 6343 is disposed on the periphery of the inlet via 6311. An outlet via 6321 is formed in the second surface 634 and in communication with the outlet passage 632. A groove 6342 is disposed around the outlet via 6321. Moreover, plural recesses 63b are formed in the second surface 634 of the valve body 63.

The valve chamber seat 65 comprises a third surface 655, a fourth surface 656, plural posts 65a, an inlet valve channel 651, an outlet valve channel 652 and a pressure chamber 657. The plural posts 65a are formed on the third surface 655. The posts 65a are aligned with the corresponding recesses 63b of the valve body 63. When the posts 65a are inserted into the corresponding recesses 63b of the valve body 63, the valve body 63 and the valve chamber seat 65 are locked and combined together. The inlet valve channel 651 and the outlet valve channel 652 penetrate the third surface 655 and the fourth surface 656. A groove 653 is formed in the third surface 655 and disposed around the inlet valve channel 651. A protrusion block 6521 is disposed on the periphery of the outlet valve channel 652. A groove 654 is formed in the third surface 655 and disposed around the outlet valve channel 652. The pressure chamber 657 is concavely formed in the fourth surface 656, and in communication with the inlet valve channel 651 and the outlet valve channel 652. Moreover, a concave structure 658 is formed in the fourth surface 656 and disposed around the pressure chamber 657.

Figure 8:
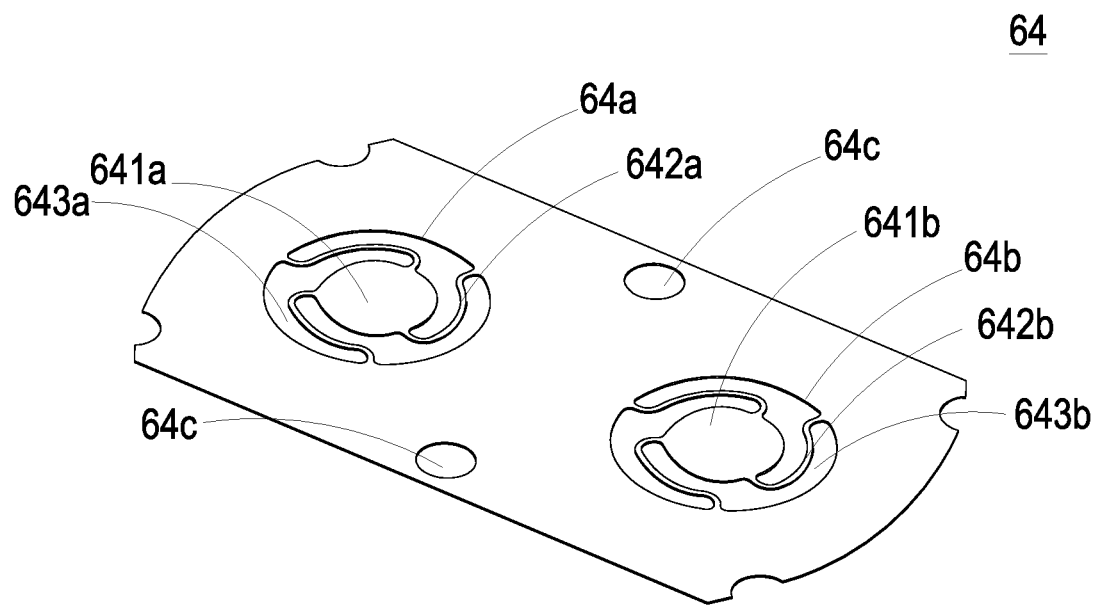
FIG. 8 is a schematic top view illustrating the valve membrane of the fluid transportation device of FIG. 4.

FIG. 8 is a schematic top view illustrating the valve membrane of the fluid transportation device of FIG. 4. Please refer to FIGS. 5A, 5B and 8. In an embodiment, the valve membrane 64 is made of polyimide (PI), and the valve membrane 64 is produced by a reactive ion etching (RIE) process, in which a photosensitive photoresist is applied to the valve structure and the pattern of the valve structure is exposed to light, then the polyimide layer uncovered by the photoresist is etched so that the valve structure of the valve membrane 64 is formed. The valve membrane 64 is a flat thin film structure. As shown in FIG. 8, the valve membrane 64 comprises two valve plates 641a and 641b at two perforated regions 64a and 64b, respectively. The two valve plates 641a and 641b have the same thickness. The valve membrane 64 further comprises plural extension parts 642a and 642b. The extension parts 642a and 642b are arranged around the valve plates 641a and 641b for elastically supporting the valve plates 641a and 641b. The valve membrane 64 further comprises plural hollow parts 643a and 643b, each of which is formed between two adjacent extension parts 642a and 642b. When an external force is exerted on any one of the valve plates 641a and 641b, deformation and displacement of which occur, since it is elastically supported by the extension parts 642a and 642b. Consequently, a valve structure is formed. Preferably but not exclusively, the valve plates 641a and 641b have circular shapes, rectangular shapes, square shapes or arbitrary shapes. The valve membrane 64 further comprises plural positioning holes 64c. The posts 65a of the valve chamber seat 65 are inserted into the corresponding positioning holes 64c. Consequently, the valve membrane 64 is positioned on the valve chamber seat 65. Meanwhile, the inlet valve channel 651 and the outlet valve channel 652 are respectively covered by the valve plates 641a and 641b (see FIG. 8). In this embodiment, the valve chamber seat 65 comprises two posts 65a and valve membrane 64 comprises two positioning holes 64c. It is noted that the number of the posts 65a and the number of the positioning holes 64c are not restricted.

Figure 11:
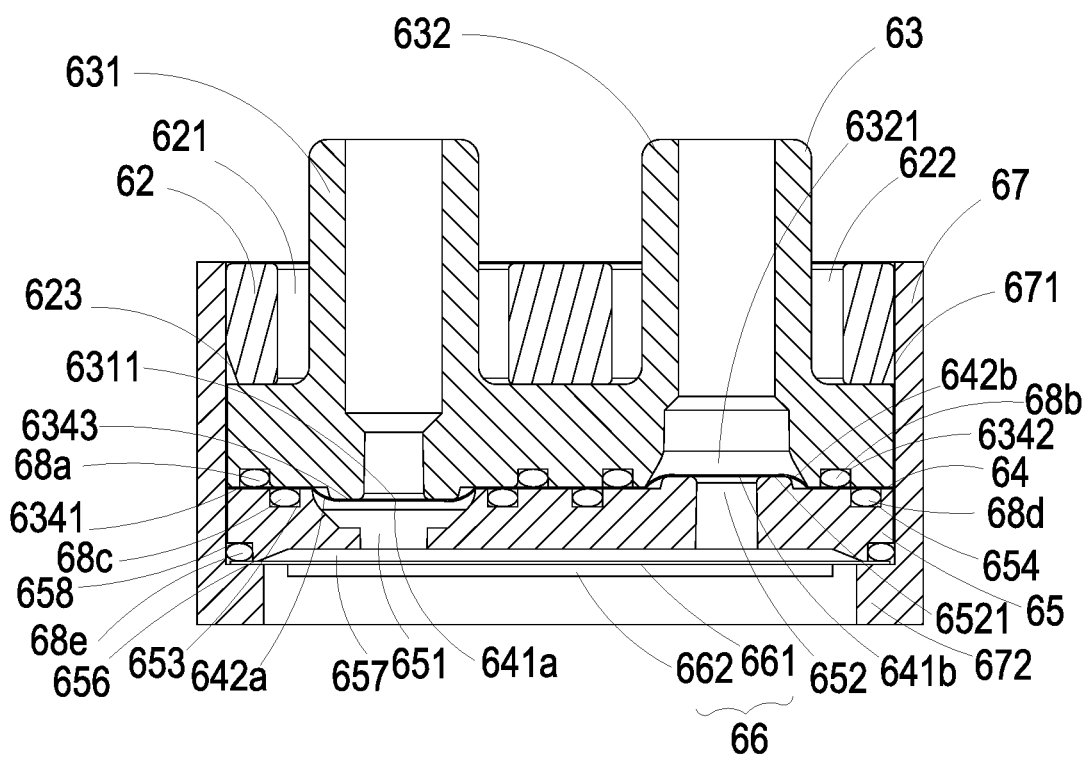
FIG. 11 is a schematic cross-sectional view illustrating the assembled structure of the fluid transportation device of FIG. 4.

FIG. 11 is a schematic cross-sectional view illustrating the assembled structure of the fluid transportation device of FIG. 4. When the valve body 63 and the valve chamber seat 65 are combined together, four sealing rings 68a, 68b, 68c and 68d are received in the groove 6341 of the valve body 63, the groove 6342 of the valve body 63, the groove 653 of the valve chamber seat 65 and the groove 654 of the valve chamber seat 65, respectively. Due to the sealing rings 68*a*, 68*b*, 68*c* and 68*d*, the fluid is not leaked out after the valve body 63 and the valve chamber seat 65 are combined together. The inlet passage 631 of the valve body 63 is aligned with the inlet valve channel 651 of the valve chamber seat 65. The communication between the inlet passage 631 and the inlet valve channel 651 is selectively enabled or disabled through the valve plate 641*a* of the valve membrane 64. The outlet passage 632 of the valve body 63 is aligned with the outlet valve channel 652 of the valve chamber seat 65. The communication between the outlet passage 632 and the outlet valve channel 652 is selectively enabled or disabled through the valve plate 641*b* of the valve membrane 64. When the valve plate 641*a* of the valve membrane 64 is opened, the fluid is transferred from the inlet passage 631 to the pressure chamber 657 through the inlet valve channel 651. When the valve plate 641*b* of the valve membrane 64 is opened, the fluid is transferred from the pressure chamber 657 to the outlet passage 632 through the outlet valve channel 652.

Please refer to FIGS. 5A and 5B again. The actuator 66 comprises a vibration plate 661 and a piezoelectric element 662. The piezoelectric element 662 may be a square plate, and is attached on the surface of the vibration plate 661. In an embodiment, the vibration plate 661 is made of a metallic material, and the piezoelectric element 662 is made of a highly-piezoelectric material such as lead zirconate titanate (PZT) piezoelectric powder. When a voltage is applied to the piezoelectric element 662, the piezoelectric element 662 is subjected to a deformation. Consequently, the vibration plate 661 is vibrated along the vertical direction in the reciprocating manner to drive the operation of the fluid transportation device 6. In this embodiment, the vibration plate 661 of the actuator 66 is assembled with the fourth surface 656 of the valve chamber seat 65 to cover the pressure chamber 657. As mentioned above, the concave structure 658 is formed in the fourth surface 656 and disposed around the pressure chamber 657. For preventing from the fluid leakage, a sealing ring 68*e* is received in the concave structure 658.

As mentioned above, the valve body 63, the valve membrane 64, the valve chamber seat 65 and the actuator 66 are the main components of the fluid transportation device 6 for guiding the fluid. In accordance with the feature of the present invention, the fluid transportation device 6 has a specified mechanism for assembling and positioning these components. That is, it is not necessary to use the fastening elements (e.g., screws, nuts or bolts) to fasten these components. In an embodiment, the valve body 63, the valve membrane 64, the valve chamber seat 65 and the actuator 66 are sequentially stacked on each other and accommodated within the outer sleeve 67. Then, a valve cover 62 is tight-fitted into the outer sleeve 67. Consequently, the fluid transportation device 6 is assembled. The mechanism for assembling and positioning these components will be described as follows.

Figure 9:
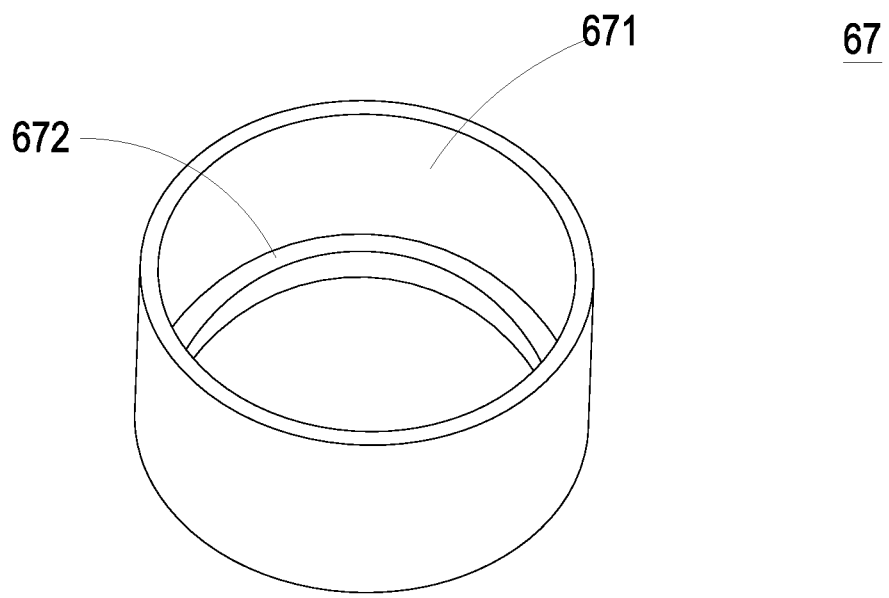
FIG. 9 is a schematic perspective view illustrating the outer sleeve of the fluid transportation device of FIG. 4.

FIG. 9 is a schematic perspective view illustrating the outer sleeve of the fluid transportation device of FIG. 4. Please refer to FIGS. 5A, 5B and 9. The outer sleeve 67 is made of a metallic material. An accommodation space is defined by an inner wall 671 of the outer sleeve 67. Moreover, a ring-shaped protrusion structure 672 is formed on the lower portion of the inner wall 671 of the outer sleeve 67.

Figure 10A:
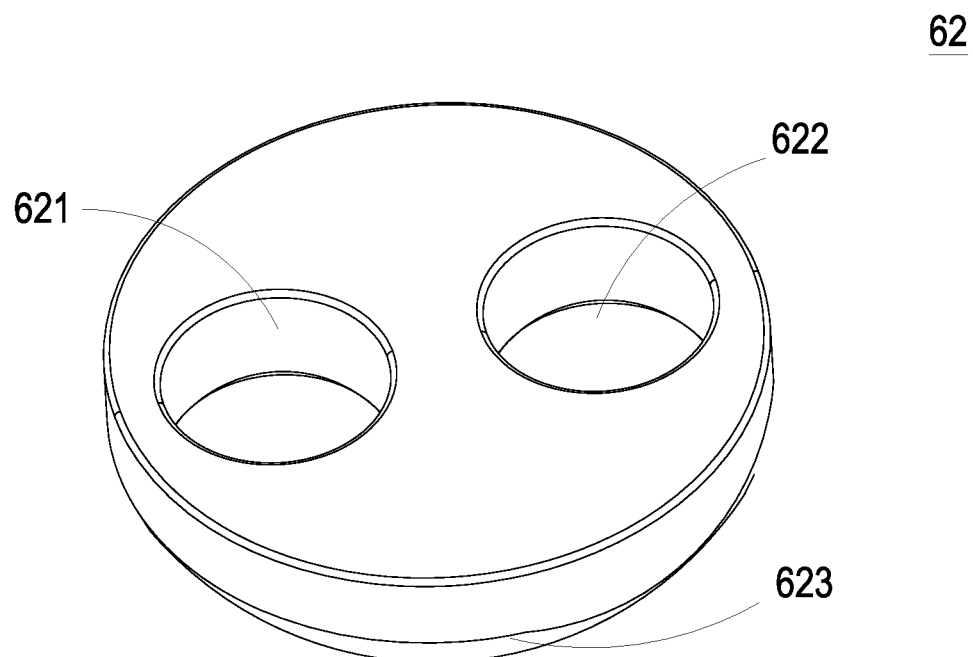
FIG. 10A is a schematic perspective view illustrating the valve cover of the fluid transportation device of FIG. 4 and taken along the front side.
Figure 10B:
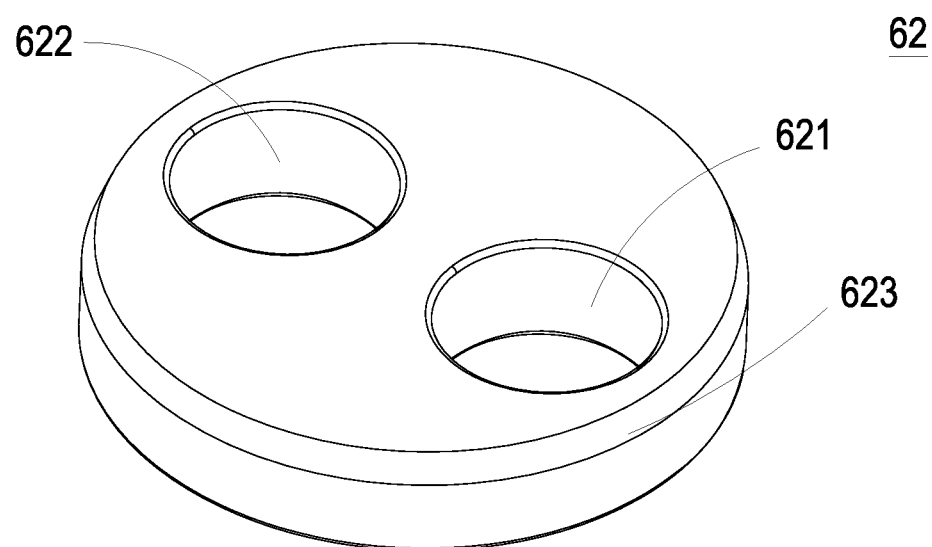
FIG. 10B is a schematic perspective view illustrating the valve cover of the fluid transportation device of FIG. 4 and taken along the rear side.

FIG. 10A is a schematic perspective view illustrating the valve cover of the fluid transportation device of FIG. 4 and taken along the front side. FIG. 10B is a schematic perspective view illustrating the valve cover of the fluid transportation device of FIG. 4 and taken along the rear side. The valve cover 62 is also made of a metallic material. The valve cover 62 comprises a first via 621 and a second via 622. The inlet passage 631 and the outlet passage 632 of the valve body 63 are inserted into the first via 621 and the second via 622, respectively. Moreover, a bottom edge of the valve cover 62 has a chamfer structure 623. The outer diameter of the valve cover 62 is slightly larger than the inner diameter of the outer sleeve 67.

Please refer to FIGS. 5A and 5B again. The valve body 63, the valve membrane 64, the valve chamber seat 65 and the actuator 66 are sequentially stacked on each other and placed into the accommodation space within the inner wall 671 of the outer sleeve 67, being supported by the ring-shaped protrusion structure 672 of the outer sleeve 67. As mentioned above, the outer diameter of the valve cover 62 is slightly larger than the inner diameter of the outer sleeve 67. Due to the chamfer structure 623, the valve cover 62 is tight-fitted into the outer sleeve 67. Consequently, the combination of the valve body 63, the valve membrane 64, the valve chamber seat 65 and the actuator 66 is securely fixed between the valve cover 62 and the outer sleeve 67. Meanwhile, the fluid transportation device 6 is assembled. In this embodiment, the actuator 66 is also disposed within the accommodation space of the outer sleeve 67. When piezoelectric element 662 is subjected to a deformation in response to the applied voltage, the vibration plate 661 is vibrated along the vertical direction in the reciprocating manner. In other words, it is not necessary to use the fastening elements (e.g., screws, nuts or bolts) to fasten the components of the fluid transportation device 6.

Please refer to FIG. 11 again. The inlet valve channel 651 of the valve chamber seat 65 is aligned with the inlet via 6311 of the valve body 63, and the inlet valve channel 651 of the valve chamber seat 65 and the inlet via 6311 of the valve body 63 are selectively in communication with each other through the valve plate 641*a* of the valve membrane 64. When the inlet via 6311 of the valve body 63 is closed by the valve plate 641*a*, the valve plate 641*a* is in close contact with the protrusion block 6343 of the valve body 63. Consequently, a pre-force is generated to result in a stronger sealing effect, and the fluid will not be returned back. Similarly, the outlet valve channel 652 of the valve chamber seat 65 is aligned with the outlet via 6321 of the valve body 63, and the outlet valve channel 652 of the valve chamber seat 65 and the outlet via 6321 of the valve body 63 are selectively in communication with each other through the valve plate 641*b* of the valve membrane 64. When the outlet valve channel 652 of the valve chamber seat 65 is closed by the valve plate 641*b*, the valve plate 641*b* is in close contact with the protrusion block 6521 of the valve chamber seat 65. Consequently, a pre-force is generated to result in a stronger sealing effect, and the fluid will not be returned back to the pressure chamber 657. Under this circumstance, in case that the fluid transportation device 6 is disabled, the fluid is not returned back to the inlet passage 631 and the outlet passage 632 of the valve body 63.

Figure 12A:
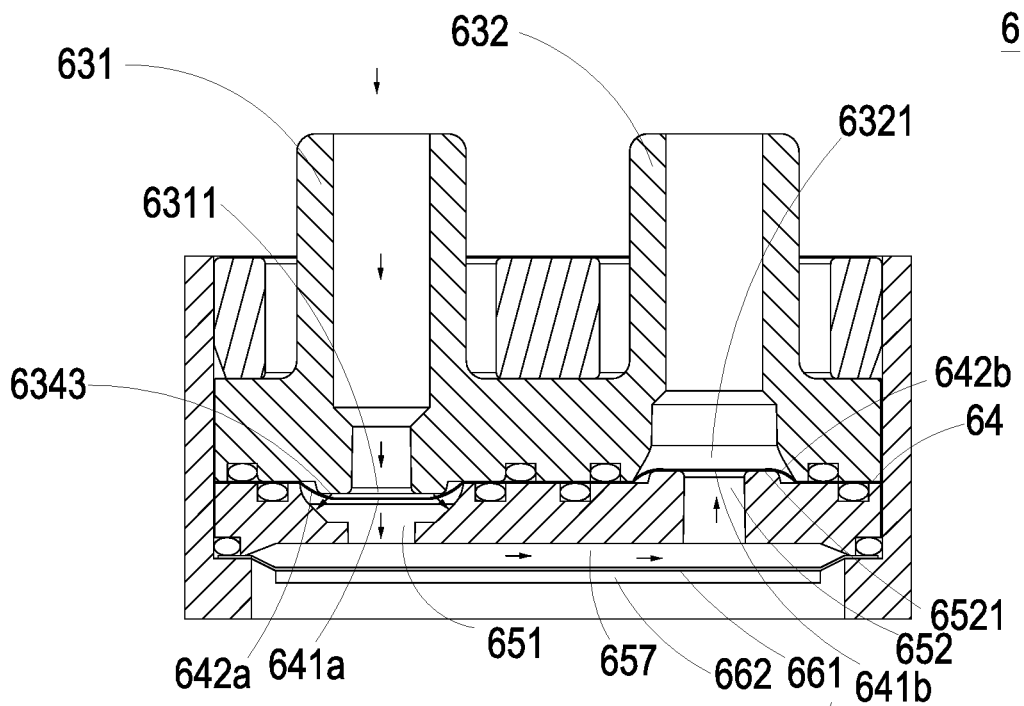
FIG. 12A is a schematic view illustrating the operations of the fluid transportation device in a first situation.

The operations of the fluid transportation device 6 will be described in more details as follows. FIG. 12A is a schematic view illustrating the operations of the fluid transportation device in a first situation. When the piezoelectric element 662 of the actuator 66 is subjected to a deformation in response to the applied voltage and causes downwardly deformation of the vibration plate 661, the volume of the pressure chamber 657 is expanded to result in suction. In response to the suction, the valve plate 641*a* of the valve membrane 64 is quickly opened. Consequently, a great amount of the fluid is inhaled into the inlet passage 631 of the valve body 63, transferred to the pressure chamber 657 through the inlet via 6311 of the valve body 63, the hollow parts 643a of the valve membrane 64 and the inlet valve channel 651 of the valve chamber seat 65. Then, the inhaled fluid is temporarily stored in the pressure chamber 657. Since the suction is also exerted on the outlet valve channel 652, the valve plate 641b supported by the extension parts 642b of the valve membrane 64 is in close contact with the protrusion block 6521 of the valve chamber seat 65. Consequently, the valve plate 641b is tightly closed.

Figure 12B:
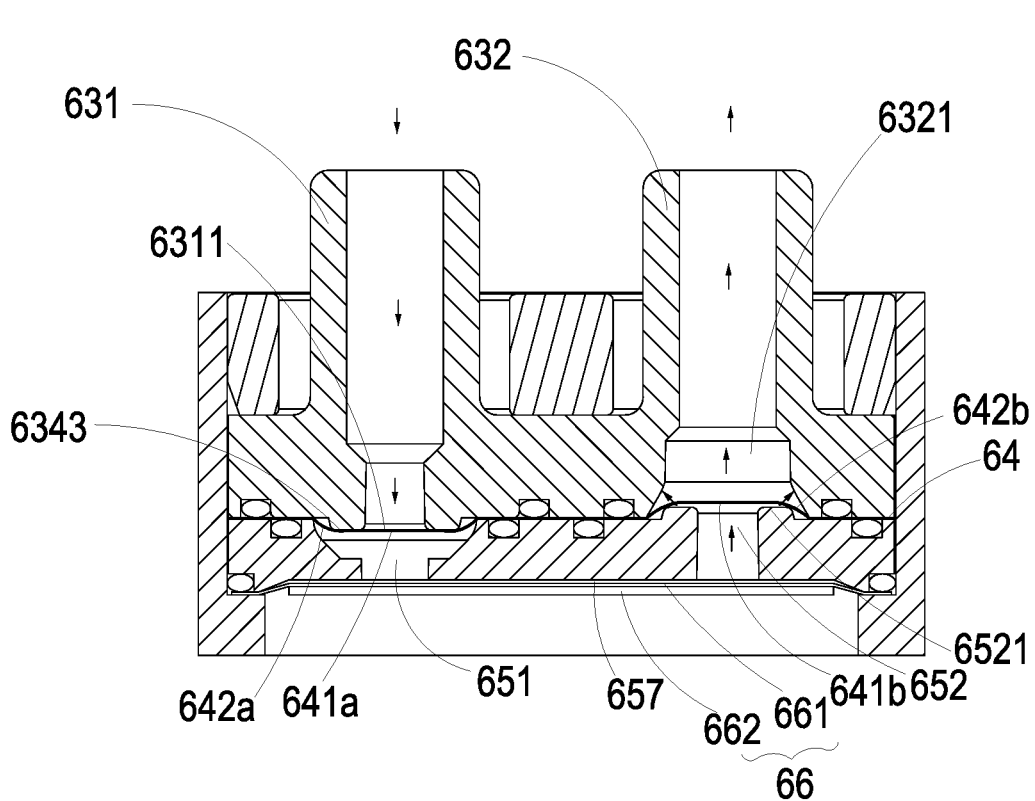
FIG. 12B is a schematic view illustrating the operations of the fluid transportation device in a second situation.

FIG. 12B is a schematic view illustrating the operations of the fluid transportation device in a second situation. Once, the direction of electric field which is applied to the piezoelectric element 662 is changed, the piezoelectric element 662 drives the vibration plate 661 to deform upwardly, and the volume of the pressure chamber 657 is shrunken. As a result, the fluid within the pressure chamber 657 is compressed, generating a pushing force applied to the inlet valve channel 651. In response to the pushing force, the valve plate 641a supported by the extension parts 642a of the valve membrane 64 is in close contact with the protrusion block 6343 of the valve body 63 to be closed. Consequently, the fluid cannot be returned back to the inlet valve channel 651. Meanwhile, the pushing force is also applied to the outlet valve channel 652. In response to the pushing force, the valve plate 641b supported by the extension parts 642b of the valve membrane 64 is separated from the protrusion block 6521 to be open. Consequently, the fluid is transferred from the pressure chamber 657 to the external portion of the fluid transportation device 6 through the outlet valve channel 652 of the valve chamber seat 65, the hollow parts 643b of the valve membrane 64, the outlet via 6321 of the valve body 63 and the outlet passage 632 of the valve body 63, sequentially.

The processes of FIGS. 12A and 12B are repeatedly done. Consequently, the fluid can be transferred by the fluid transportation device 6 at high efficiency without being returned back.

The fluid transportation device 6 is disposed between the sensing unit 3 and the atomizer 4. The inlet passage 631 and the input channel 6a of the fluid transportation device 6 are connected with each other. The fluid transportation device 6 is in communication with the liquid container 52 through the input channel 6a. The outlet passage 632 and the output channel 6b of the fluid transportation device 6 are connected with each other. The output channel 6b of the fluid transportation device 6 is in communication with the input port 441 of the liquid conduit 44 of the atomizer 4. When the fluid transportation device 6 is enabled, the cigarette liquid is transferred from the liquid container 52 to the liquid conduit 44 through the fluid transportation device 6 and then transferred to the outside of the liquid conduit 44 through the perforations 442. In response to the control signal from the control module 22, the fluid transportation device 6 is enabled. Since the fluid transportation device 6 is used as a switch element, the cigarette liquid is transferred from the liquid container 52 to the liquid conduit 44 through the fluid transportation device 6 at a certain amount. Under the same pressure, the cigarette liquid is uniformly transferred to the outside of the liquid conduit 44 through the perforations 442 to generate uniform droplets. Once the cigarette liquid in the liquid conduit 44 reaches a saturation state, the fluid transportation device 6 is disabled. In other words, the cooperation of the fluid transportation device 6 and the atomizer 4 forms a controllable switch element in order for precisely controlling the amount of the cigarette liquid to be transferred to the atomizer 4. Consequently, the taste of the atomized vapor is enhanced, and the liquid leakage problem is solved.

Please refer to FIGS. 2A and 2C. The mouthpiece 9 is located at an end of the second casing 1b. Moreover, the mouthpiece 9 is in communication with the passageway 51 of the liquid storage structure 5. The mouthpiece 9 comprises a filter 91 and a mouth 92. The filter 91 is located at an end of the passageway 51 of the liquid storage structure 5. In case that the cigarette liquid is not atomized, the cigarette liquid is stopped by the filter 91. Consequently, the cigarette liquid cannot be inhaled by the user. In one embodiment, the cigarette liquid is blocked by the filter 91 when being initially heated and incompletely atomized such that a guard against inhalation as a protection measure is formed. In another embodiment, the filter 91 is disposed on a second end of the passageway 51, and the electric heater 41 is disposed on a first end of the passageway 51.

The operations of the electronic cigarette will be described as follows. When the user smokes and inhales the air through the mouth 92 of the mouthpiece 9, the airflow flows through the electronic cigarette. According to the sensing result of the sensing unit 3, the electric circuit of the electronic cigarette is enabled. After the electric circuit of the electronic cigarette is enabled, the power supply device 2 provides electric power to the heater module 23. Consequently, the electric heater 41 is enabled to heat the cigarette liquid. Meanwhile, the cigarette liquid is heated and atomized by the electric heater 41. The cooperation of the fluid transportation device 6 and the atomizer 4 forms a controllable switch element in order for precisely controlling the amount of the cigarette liquid to be transferred to the atomizer 4 at a certain amount. Consequently, the user inhales the atomized vapor from the passageway 51 of the liquid storage structure 5 through the mouth 92 of the mouthpiece 9. When the user stops smoking through the mouth 92 of the mouthpiece 9, the airflow does not flow through the electronic cigarette. According to the sensing result of the sensing unit 3, the electric circuit of the electronic cigarette is disabled. Meanwhile, the electric heater 41 is disabled.

When the user inhales the atomized vapor through the mouth 92 of the mouthpiece 9, the air pressure sensor 32 issues a detection signal to the control module 22 according to the result of detecting the pressure of the airflow. According to the detection signal, the control module 22 adjusts the speed of atomizing the cigarette liquid and the speed of providing the cigarette liquid. That is, the control signal from the control module 22 is adjusted according to the detection signal. Since the driving frequency of the fluid transportation device 6 and the driving power of the heater module 23 are correspondingly changed according to the control signal, the speed of atomizing the cigarette liquid and the speed of providing the cigarette liquid are adjusted. Consequently, the user can inhale a great amount of atomized vapor quickly, or the user can inhale the same amount of atomized vapor.

From the above descriptions, the present invention provides the electronic cigarette. The cooperation of the fluid transportation device and the liquid conduit of the atomizer forms the controllable switch element. The amount of the cigarette liquid to be transferred to the atomizer is precisely controlled by the controllable switch element. The electronic cigarette includes an airflow sensor and an air pressure sensor. The air pressure sensor issues a detection signal to the control module according to the result of detecting the pressure of the airflow. According to the detection signal, a control module adjusts the speed of atomizing the cigarette liquid and the speed of providing the cigarette liquid. That is, the control signal from the control module is adjusted according to the detection signal. Since the driving frequency of the fluid transportation device and the driving power of the heater module are correspondingly changed according to the control signal, the speed of atomizing the cigarette liquid and the speed of providing the cigarette liquid are adjusted. Consequently, the fluid can be transferred by the fluid transportation device at high efficiency without being returned back. Since the amount of the cigarette liquid is precisely controlled, the droplets are uniformly generated, the taste of the atomized vapor is enhanced, and the liquid leakage problem is solved. In other words, the electronic cigarette with the fluid transportation device is industrially valuable.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electronic cigarette, comprising:
a power supply device providing a driving power and a control signal;
a sensing unit switches on or off an electric circuit of the power supply device according to an airflow detected by the sensing unit;
an atomizer comprising an electric heater and a liquid conduit, wherein the liquid conduit has an input port at one end and plural perforations at the other end, and the electric heater is disposed around the liquid conduit;
a liquid storage structure comprising a passageway allowing the airflow to pass therethrough and a liquid container, wherein the electric heater is disposed on a first end of the passageway; and a cigarette liquid is stored in the liquid container;
a fluid transportation device comprising an input channel and an output channel; wherein the input channel in communication with the liquid container enables the cigarette liquid to be transferred to the liquid conduit and then the cigarette liquid is transferred to an outside of the liquid conduit through the plural perforations so that the cigarette liquid transferred to the electric heater of the atomizer for generating an atomized vapor is controlled at a certain amount;
a casing being provided with the power supply device, the sensing unit, the fluid transportation device, the atomizer, the liquid storage structure and an intake-and-electric-connection element disposed therewithin, wherein the casing has an inlet for the airflow to pass through, wherein after the airflow is fed into the inlet, the airflow passes through the sensing unit and the passageway of the liquid storage structure along an airflow path, and wherein the fluid transportation device and the electric heater of the atomizer are electrically connected with the power supply device and the sensing unit through the intake-and-electric-connection element for receiving an electric power and the control signal; and
a mouthpiece sealing an end of the casing and having a mouth in communication with the passageway of the liquid storage structure for inhaling the atomized vapor in the passageway of the liquid storage structure,
wherein the fluid transportation device further comprises:
a valve cover comprising a first via and a second via;
a valve body comprising an inlet passage, an outlet passage, a first surface and a second surface, wherein the inlet passage and the outlet passage penetrate the first surface and the second surface, an inlet via is formed in the second surface and in communication with the inlet passage, an outlet via is formed in the second surface and in communication with the outlet passage, wherein the inlet passage is connected with the input channel, and the outlet passage is connected with the output channel;
a valve membrane comprising two valve plates, plural extension parts and plural hollow parts, wherein the two valve plates have the same thickness, the plural extension parts are disposed around the valve plates for elastically supporting the valve plates, and the hollow parts are disposed between the extension parts;
a valve chamber seat comprising a third surface, a fourth surface, an inlet valve channel, an outlet valve channel and a pressure chamber, wherein the inlet valve channel and the outlet valve channel penetrate the third surface and the fourth surface, the two valve plates are supported on the inlet valve channel and the outlet valve channel, the pressure chamber is concavely formed in the fourth surface, and the pressure chamber is in communication with the inlet valve channel and the outlet valve channel;
an actuator, wherein the pressure chamber of the valve chamber seat is covered by the actuator; and
an outer sleeve, wherein an accommodation space is defined by an inner wall of the outer sleeve, and a ring-shaped protrusion structure is formed on the inner wall of the outer sleeve,
wherein the valve body, the valve membrane, the valve chamber seat and the actuator are sequentially stacked on each other, accommodated within the accommodation space of the outer sleeve, and supported on the ring-shaped protrusion structure, wherein the inlet passage and the outlet passage of the valve body are respectively inserted into the first via and the second via of the valve cover, wherein while the actuator is enabled, the cigarette liquid is fed into the inlet passage and outputted from the outlet passage.

2. The electronic cigarette according to claim 1, wherein the casing is an assembly of a first casing and a second casing, wherein the power supply device and the sensing unit are disposed within the first casing, and the fluid transportation device, the atomizer and the liquid storage structure are disposed within the second casing.

3. The electronic cigarette according to claim 1, wherein the power supply device comprises a power module, a control module, a heater module and a light emitting diode.

4. The electronic cigarette according to claim 3, wherein the power module of the power supply device is a rechargeable battery for providing the driving power to the control module, the heater module, the sensing unit and the fluid transportation device.

5. The electronic cigarette according to claim 3, wherein the power module of the power supply device is a disposable battery for providing the driving power to the control module, the heater module, the sensing unit and the fluid transportation device.

6. The electronic cigarette according to claim 3, wherein the control module provides a first control signal to the heater module and provides a second control signal and the driving power to the fluid transportation device.

7. The electronic cigarette according to claim 3, wherein the heater module of the power supply device provides electric energy to the electric heater of the atomizer.

8. The electronic cigarette according to claim 3, wherein the light emitting diode of the power supply device is located at a front end of the casing, wherein under control of the control module, the light emitting diode is turned on or turned off to provide or not provide a prompt signal so as to indicate an operating condition of the electronic cigarette.

9. The electronic cigarette according to claim 3, wherein the light emitting diode of the power supply device is located at a front end of the casing, wherein under control of the control module, the light emitting diode provides a prompt signal to indicate an intensity of the atomized vapor.

10. The electronic cigarette according to claim 1, wherein the sensing unit includes an airflow sensor and an air pressure sensor, wherein the electric circuit of the power supply device is selectively enabled or disabled according to a result of detecting the airflow by the airflow sensor, and the air pressure sensor issues a detection signal to the control module according to a result of detecting a pressure of the airflow, wherein according to the detection signal, the control module adjusts a speed of atomizing the cigarette liquid and a speed of providing the cigarette liquid.

11. The electronic cigarette according to claim 1, wherein the liquid conduit is a stainless steel tube.

12. The electronic cigarette according to claim 1, wherein the mouthpiece further comprises a filter located at an end of the passageway of the liquid storage structure such that the cigarette liquid is blocked by the filter when being initially heated and incompletely atomized such that a guard against inhalation as a protection measure is formed.

13. The electronic cigarette according to claim 1, wherein plural recesses are formed in the second surface of the valve body, and plural posts are formed on the third surface of the valve chamber seat, wherein the plural posts are inserted into the corresponding recesses, so that the valve chamber seat is fixed on the valve body.

14. The electronic cigarette according to claim 13, wherein the valve membrane is disposed between the valve body and the valve chamber seat, and the valve membrane comprises plural positioning holes corresponding to the plural posts, wherein the plural posts are inserted into the corresponding positioning holes, so that the valve membrane is positioned and supported on the valve chamber seat.

15. The electronic cigarette according to claim 1, wherein a first groove is formed in the second surface and disposed around the inlet via, a second groove is formed in the second surface and disposed around the outlet via, a third groove is formed in the third surface and disposed around the inlet valve channel, and a fourth groove is formed in the third surface and disposed around the outlet valve channel, wherein the fluid transportation device further comprises plural sealing rings, and the plural sealing rings are received in the first groove, the second groove, the third groove and the fourth groove, respectively.

16. The electronic cigarette according to claim 1, wherein a first protrusion block is formed on the second surface of the valve body and disposed on a periphery of the inlet via, and a second protrusion block is formed on the third surface and disposed on a periphery of the outlet valve channel, wherein the first protrusion block and the second protrusion block are cooperated with the two valve plates respectively to form pre-forces for sealing and preventing the cigarette liquid from returning back.

17. The electronic cigarette according to claim 1, wherein the actuator comprises a vibration plate and a piezoelectric element, wherein the piezoelectric element is attached on a surface of the vibration plate, the piezoelectric element is subjected to a deformation in response to an applied voltage, and the vibration plate of the actuator is assembled with the fourth surface of the valve chamber seat to cover the pressure chamber.

\* \* \* \* \*